United States Patent
Agrawal et al.

(10) Patent No.: US 9,173,140 B2
(45) Date of Patent: Oct. 27, 2015

(54) METHODS AND APPARATUS FOR HANDOVER MANAGEMENT

(75) Inventors: Rajeev Agrawal, Glenview, IL (US); Rangsan Leelahakriengkrai, Overland Park, KS (US); Anand S. Bedekar, Arlington Heights, IL (US); Guang Han, Buffalo Grove, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 599 days.

(21) Appl. No.: 13/332,527

(22) Filed: Dec. 21, 2011

(65) Prior Publication Data

US 2013/0084864 A1   Apr. 4, 2013

Related U.S. Application Data

(60) Provisional application No. 61/540,697, filed on Sep. 29, 2011, provisional application No. 61/540,752, filed on Sep. 29, 2011.

(51) Int. Cl.
| | |
|---|---|
| *H04W 72/00* | (2009.01) |
| *H04W 36/00* | (2009.01) |
| *H04W 36/04* | (2009.01) |
| *H04W 36/30* | (2009.01) |
| *H04W 84/04* | (2009.01) |

(52) U.S. Cl.
CPC .......... *H04W 36/0083* (2013.01); *H04W 36/04* (2013.01); *H04W 36/30* (2013.01); *H04W 84/045* (2013.01)

(58) Field of Classification Search
CPC ...................................................... H04W 72/00
USPC ......................................................... 455/453
See application file for complete search history.

(56) References Cited

U.S. PATENT DOCUMENTS

| | | | |
|---|---|---|---|
| 2004/0185868 A1* | 9/2004 | Jain et al. ....................... | 455/453 |
| 2010/0267408 A1 | 10/2010 | Lee et al. ....................... | 455/509 |
| 2011/0164489 A1 | 7/2011 | Papasakellariou et al. ... | 370/203 |

(Continued)

FOREIGN PATENT DOCUMENTS

| | | |
|---|---|---|
| KR | 2010/0118941 A | 11/2010 |
| WO | WO-2010/116340 A1 | 10/2010 |

OTHER PUBLICATIONS

Damnjanovic, A., et al.; A Survey on 3GPP Heterogeneous Networks; IEEE Wireless Communications • Jun. 2011; vol. 18, Issue 3; abstract; pp. 17-18,20; figure 5; "Interference management for co-channel deployments", "Conclusions" (http://www.slideshare.net/zahidtg/a-survey-on3gpphetrogeneousnetworks).

(Continued)

*Primary Examiner* — Huy C Ho
(74) *Attorney, Agent, or Firm* — Harrington & Smith (57) ABSTRACT

Systems and techniques for handover management in wireless communication networks. An apparatus, such as a base station, receives information relating to load conditions and computes handover threshold information based on the information relating to the load conditions. The information relating to the load conditions may comprise information received from other base stations, and the base station may in turn share its own information. Information may be shared through direct communication between base stations, or may be managed by a controller. Handover thresholds may be set for user devices based on the load metric information.

19 Claims, 4 Drawing Sheets

(56) References Cited

U.S. PATENT DOCUMENTS

| | | | |
|---|---|---|---|
| 2011/0249642 A1 | 10/2011 | Song et al. | 370/329 |
| 2011/0310830 A1 | 12/2011 | Wu et al. | 370/329 |
| 2012/0003987 A1* | 1/2012 | Vasudevan et al. | 455/453 |
| 2012/0087298 A1 | 4/2012 | Garavaglia et al. | 370/315 |
| 2012/0099505 A1 | 4/2012 | Wang et al. | 370/312 |
| 2012/0157082 A1 | 6/2012 | Pedersen et al. | 455/422.1 |
| 2012/0231790 A1 | 9/2012 | Lindoff et al. | 455/434 |

OTHER PUBLICATIONS

Vajapeyam, M., et al.; "Downlink FTP Performance of Heterogeneous Networks for LTE-Advance" Vajapeyam, M., et al. Communications Workshop (ICC), 2011 IEEE International Conference of Jun. 5-9, 2011; abstract; pp. 2-3; "LTE-A HetNet Techniques", "Conclusions".

3GPP TSG RAN WG1 Meeting #62; R1-104416; Madrid, Spain, Aug. 23-27, 2010; Further Considerations of Time Domain Approach; Alcatel-Lucent, Alcatel-Lucent Shanghai Bell.

"Range Expansion and Inter-Cell Interference Coordination (ICIC) for Picocell Networks" Guvenc, I., et al; Vehicular Technology Conference (VTC Fall) 2011 IEE, Sep. 5-8, 2011; abstract; p. 5; "C. Impact of Range Expansion on Fairness".

3GPP TR 36.902 V9.3.1 (Mar. 2011) 3rd Generation Partnership Project; Technical Specification Group Radio Access Network; Evolved Universal Terrestrial Radio Access Network (E-UTRAN); Self-configuring and self-optimizing network (SON) use cases and solutions (Release 9) (21 pages).

3GPP TS 36.420 V10.1.0 (Jun. 2011) 3rd Generation Partnership Project; Technical Specification Group Radio Access Network; Evolved Universal Terrestrial Radio Access Network (E-UTRAN); X2 general aspects and principles (Release 10) (6 pages).

3GPP TS 36.421 V10.0.1 (Mar. 2011) 3rd Generation Partnership Project; Technical Specification Group Radio Access Network; Evolved Universal Terrestrial Radio Access Network (E-UTRAN); X2 layer 1 (Release 10).

3GPP TS 36.422 V10.1.0 (Jun. 2011) 3rd Generation Partnership Project; Technical Specification Group Radio Access Network; Evolved Universal Terrestrial Radio Access Network (E-UTRAN); X2 signalling transport (Release 10) (8 pages).

3GPP TS 36.423 V10.2.0 (Jun. 2011) 3rd Generation Partnership Project; Technical Specification Group Radio Access Network; Evolved Universal Terrestrial Radio Access Network (E-UTRAN); X2 application protocol (X2AP) (Release 10) (130 pages).

Alcatel-Lucent; "Handover Performance and Improvements in Co-channel HetNet"; R2-106550; 3GPP TSG-RAN WG2 Meeting #72, Jacksonville, USA, Nov. 15-Nov. 19, 2010; abstract, Section 5.2.

Kwan R. et al.; "On Mobility Load Balancing for LTE Systems"; IEEE 72nd Vehicular Technology Conference Fall (VTC 2010—Fall), Ottawa, Canada; Sep. 2010; pp. 1-5, 6-9; doi: 10.1109/VETECF.2010.5594565; URL: http://ieeexplore.ieee.org/stamp/stamp.jsp?tp=&arnumber=5594565&isnumber=5594061; abstract; Sections I-II.B.

Huawei et al.; "Simulation for HetNet mobility studies"; R2-114102; 3GPP TSG-RAN WG2 Meeting #75, Athens, Greece; Aug. 22-26, 2011; abstract, Section 2.

* cited by examiner

METHODS AND APPARATUS FOR HANDOVER MANAGEMENT

CROSS-REFERENCE TO RELATED APPLICATIONS

This patent application claims priority under 35 U.S.C. §119(e) from Provisional Patent Application Nos. 61/540,697 and 61/540,752, both filed Sep. 29, 2011, the disclosure of each of which is incorporated by reference herein in its entirety.

FIELD OF THE INVENTION

The present invention relates generally to wireless communication. More particularly, the invention relates to systems and techniques for load-based handover management in a wireless network.

BACKGROUND

One of the greatest problems facing wireless network operators is the need to serve large numbers of customers with varying needs using the infrastructure available to them. Numerous considerations affect the number of customers that may be served by a particular set of resources, and constant efforts are being directed toward improvements in efficiency. Various mechanisms for improvement of communication efficiency involve management of handover from one cell to another. Handover typically occurs when a handover threshold between two cells is reached, such as around the point where the difference between the reference signal received power (RSRP) or reference signal received power (RSRQ) of a neighbor cell and the serving cell becomes greater than a threshold. Numerous conditions exist that may affect the proper setting of a handover boundary, and one condition of particular note is a difference in load or user location or distribution between the two cells involved in the handover. A number of signaling mechanisms exist between cells, such as the widely used X2 interface defined in the Third Generation Partnership Project (3GPP) standards, for example, 3GPP TS 36.420—Evolved Universal Terrestrial Radio Access Network (E-UTRAN); X2 general aspects and principles, 3GPP TS 36.421—Evolved Universal Terrestrial Radio Access Network (E-UTRAN); X2 layer 1, 3GPP TS 36.422—Evolved Universal Terrestrial Radio Access Network (E-UTRAN); X2 signaling, and 3GPP TS 36.423—Evolved Universal Terrestrial Radio Access Network (E-UTRAN); X2 application protocol (X2AP), and such signaling mechanisms can be used to communicate load information between cells.

One important type of cell combination calling for proper accounting for load is a combination of heterogeneous cells, such as macro and pico cells. A number of pico cells may operate within the boundaries of a macro cell, and the difference in ranges between macro and pico cells can lead to significant load imbalances. For example, a user equipment (UE) may be within the boundaries of a pico cell while still being well within the boundaries of a macro cell. If threshold calculations designed to account for cell-edge conditions are used, a UE assigned to a macro cell might not be handed over to a pico cell because the threshold conditions would not be encountered. Such an approach would lead to overloading of macro cells and underloading of pico cells. Load variations may be encountered between macro cells and between numerous other types of cell combinations. The overall throughput, and gains in throughput that may be expected from a handover, will be affected by load in many instances. Therefore, various mechanisms have been and are being developed to take loading into account when determining handover thresholds.

SUMMARY OF THE INVENTION

In one embodiment of the invention, an apparatus comprises memory, at least one processor, and a program of instructions configured to, with the memory and the at least one processor, configure the apparatus to perform actions comprising at least determining load conditions for one or more cells and determining handover procedures between the one or more cells based on load conditions for the one or more cells.

In another embodiment of the invention, an apparatus comprises memory, at least one processor, and a program of instructions configured to, with the memory and the at least one processor, configure the apparatus to perform actions comprising at least collecting load metric information for a pico eNB directed by the apparatus and reporting load metric information for the pico eNB to a macro eNB neighboring the pico eNB.

DETAILED DESCRIPTION

Various embodiments of the present invention recognize that in many cases, considerable flexibility exists in setting handover threshold. For example, a UE within the boundaries of a macro cell is likely to receive acceptable service even if it is never handed over to a pico cell which is also within the boundaries of the macro cell. This is true even if the handover would be advantageous. Further, there are mechanisms wherein the interference caused by one cell to another is artificially reduced at certain times. One such mechanism is time-division enhanced intercell interference coordination (TDM-eICIC, otherwise known as eICIC or Enhanced Inter-Cell Interference Coordination), described in 3GPP Release 10. In this approach, a macro cell, that is, a macro eNodeB (also known as eNB or base station) uses almost blank subframes (ABS) to provide for the use of large range extension by pico cells. Such range extension enhances the ability to offload UEs in the macro cell to underloaded pico cells. That is, even if ordinarily the conditions experienced by the UE in the pico cell would be too poor to warrant handover of the UE from the macro cell to the pico cell, the use of the ABS allows the UEs to experience sufficiently good conditions for a portion of the time, thereby enabling such handover to be feasible. In such cases, and in others, a primary benefit from handover operation is load management. Rather than performing a handover simply when service would otherwise be unacceptable if no handover were performed, handover may, in many cases, be performed in order to increase overall throughput by lightening the load on one cell by transferring UEs to another cell with spare capacity. Embodiments of the present invention recognize that mechanisms exist that are specifically adapted to manage loading management between macro cells and pico cells. Embodiments of the present invention further recognize that coordinating load management with scheduling provides important advantages because scheduling is one mechanism by which resources are allocated to UEs, leading to a distribution of loads between network elements. Therefore, embodiments of the present invention determine handover thresholds based on load estimates that are associated with scheduling mechanisms, such as a proportional fair (PF) scheduler. Such determinations may include embodiments directed to the use of eICIC with ABS. Once made, load determinations made at one cell may be conveyed to neighbor cells through appropriate mechanisms, at least one of which may include use of standard information elements (IEs) in 3GPP X2 messages. Determinations of load may in turn be used to compute handover thresholds, which may then be distributed for use to UEs being served by a cell and to neighbor eNBs serving neighboring cells.

Figure 1:
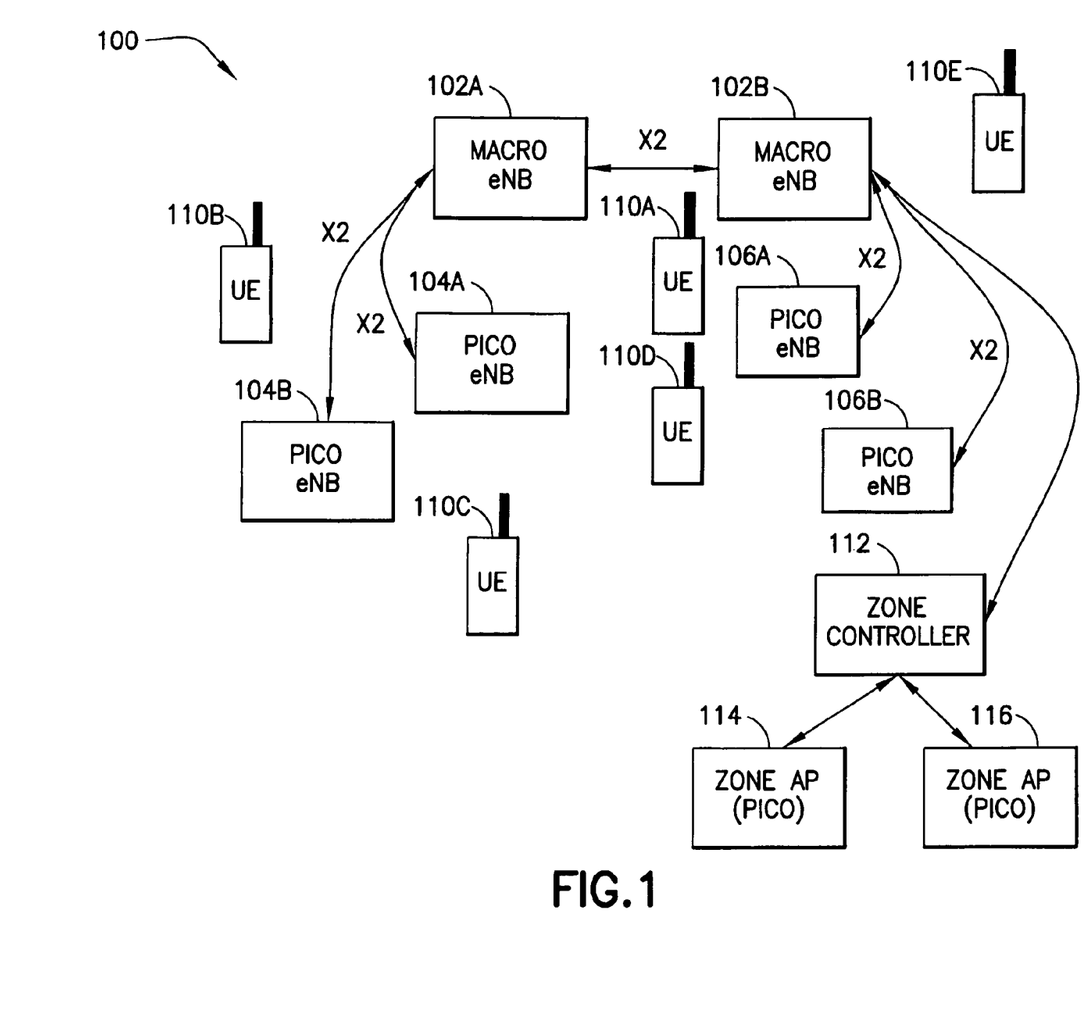
FIG. 1 illustrates a network according to an embodiment of the present invention.

FIG. 1 illustrates a network 100 suitably operating according to an embodiment of the present invention. The network 100 suitably comprises macro eNBs 102A and 102B. The network 100 also comprises pico eNBs 104A and 104B, operating in the vicinity of the macro eNB 102A, and pico eNBs 106A and 106B, operating in the vicinity of the macro eNB 102B. The macro eNBs 102A and 102B are connected to one another through an X2 connection, and the pico eNBs are also connected to their macro eNBs through an X2 connection. The network 100 further comprises UEs 110A-110E, distributed about the various eNBs and being attached to various ones of the eNBs at different times.

The network 100 also comprises a zone controller 112, and pico zone access points (APs) 114 and 116. The zone controller 112 may collect metrics for all APs under the controller, and may then report either all the individual AP metrics or a subset of AP metrics to neighboring macros, or may report a consolidated metric representing a cluster of pico cells. When selecting a subset of AP metrics, the controller may use knowledge of the topology of a cluster of pico cells. For example, if the cluster of cells consists of "interior cells" and "periphery cells", the UEs from the macro will likely first hand over to one of the periphery cells rather than to the interior cells. In this case, the zone controller may report only the metrics for the periphery cells to the macro eNB. Further, the zone controller may itself determine the handover thresholds to be applied for handovers from one pico zone access point to another, using one or more embodiments of the present invention.

Embodiments of the invention may compute a load metric based on proportional fair scheduling, and then determine handover threshold using the load metric, as discussed below.

Figure 2:
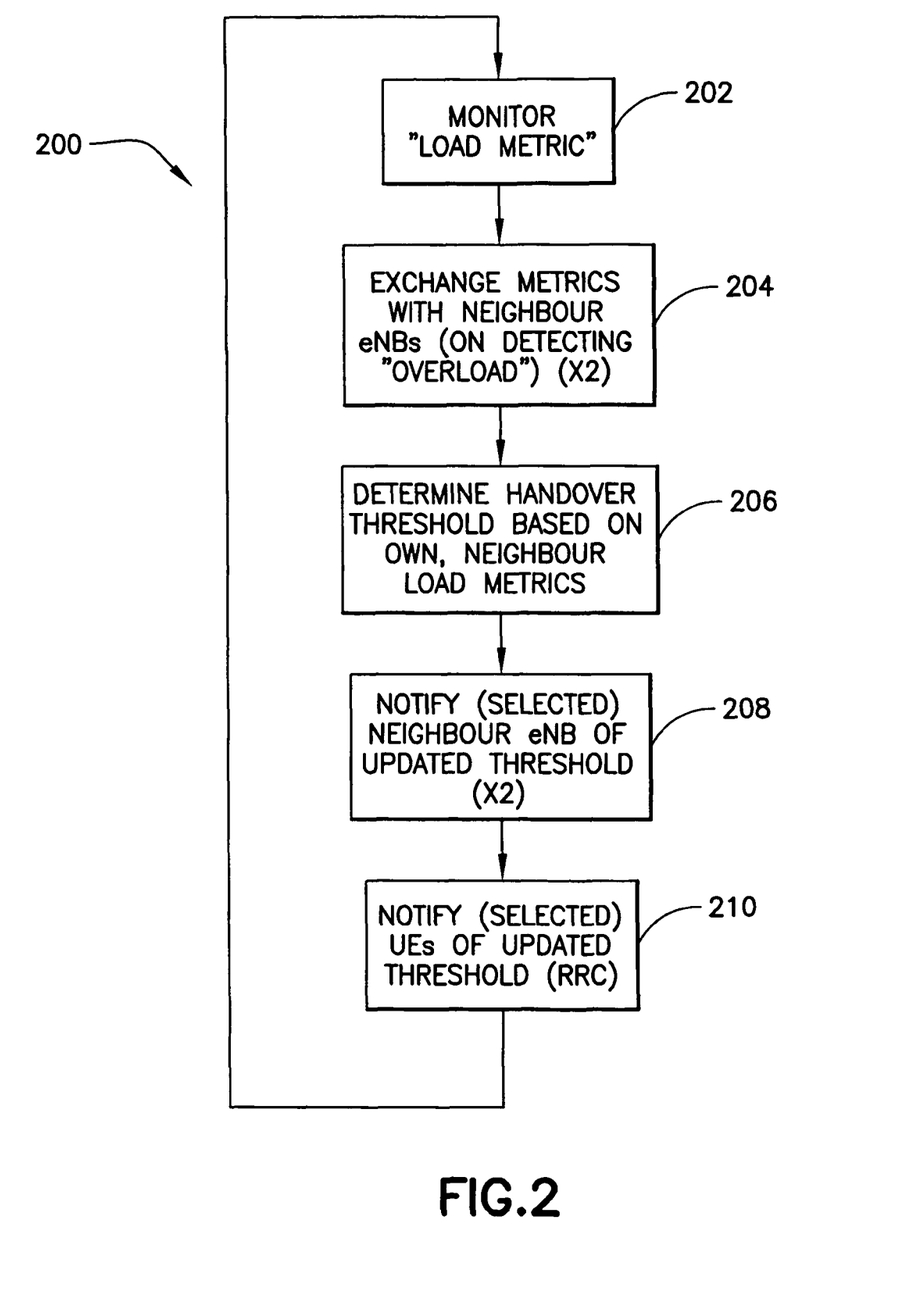
FIG. 2 illustrates a process according to an embodiment of the present invention.

FIG. 2 illustrates a process 200 of handover management according to an embodiment of the present invention. At step 202, load information for a cell of a wireless network is monitored. The monitoring may be accomplished by an eNB and may involve measurements by the eNB or measurements by UEs or other devices reported to the eNB, and may further involve quantities arising from the operation of the scheduler that allocates resources to UEs within the cell. The load information may comprise, or may be used to compute, one or more load metrics. The load metric or metrics may be weighted proportional fair metrics of scheduled UEs, with the metrics suitably comprising long term averages over an appropriate time scale. Here the PF metric of a UE is typically defined as the ratio of its instantaneous or immediate achievable throughput (or spectral efficiency, or some other measure of the current quality of the UE's channel) relative to the historic average throughput that the UE has received over a period of time. Represented as an equation, PF metric=$R_{immediate}/R_{average}$. Suitable weights may be incorporated into the definition of the PF metric to represent various quality of service attributes for which the UE may be eligible. The proportional fair scheduler in general tries to allocate resources to the UEs so as to equalize the weighted PF metric of the UEs.

The load information may be monitored for a number of cells by the eNBs, or by the devices serving or otherwise operating in the cells. At step 204, load information may be exchanged between neighboring cells. The exchange may be accomplished, for example, over an X2 connection to neighbor eNBs, using appropriate indications, such as an information element (IE) designed to indicate load status, such as a measure of available capacity, which may be expressed as a percentage or other proportion of available capacity compared to total capacity, or similar other indication of the performance a user may experience in the cell if handed over to the cell.

At step 206, handover procedures are determined for one or more cells of the network, to govern handover of a UE from one cell to another. The handover procedures may suitably determine when handover of a UE from one cell to another is to be performed, and may include determining a handover threshold. The handover threshold may suitably be computed based on metrics representing the load (or equivalently, available capacity), such as the proportional fair metrics. At step 208, upon updating of a handover threshold, one or more selected neighbor cells, or eNBs, are notified of an updated threshold, suitably using an X2 connection. The notification may take the form of an X2 mobility change procedure. At step 210, one or more UEs are notified of the updated threshold. The notification may be accomplished using existing signaling mechanisms, such as cell individual offset in RRC reconfiguration.

In one embodiment of the invention, a load metric may be calculated that is a long-term average of a proportional fair (PF) metric of scheduled UEs. For example, if the PF metrics of the scheduled UEs in subframe N in cell i are $v_i(N,u)$ and they are given resource blocks (RBs) m(u), then the overall average PF metric of scheduled UEs in cell i in subframe N may be taken as a weighted average of the PF metric of the scheduled UEs using the assigned number of resource blocks as the weights. Represented as an equation, $V_i(N)=\text{Sum}(m(u) v_i(N,u))/\text{Sum}(m(u))$.

Alternative forms of the average PF metric $V_i(N)$ of the cell i in a given subframe N are also possible, for example taking the maximum, or the median, or a certain percentile, of the PF metrics of the UEs scheduled in subframe N. The long-term average PF metric of cell i over a suitable time period T may then be taken as $v_i=(1/T)\Sigma_{N=1\ldots T}V_i(N)$. In an embodiment, the PF metric may be suitably scaled by the total number of resource blocks available, or the carrier frequency bandwidth.

When a UE can have multiple bearers, for example, with different Quality-of-Service Class Identifiers (QCIs), a weighted PF metric can be used instead. For example, when a weight is associated with each QCI, the PF metric for a given scheduled UE would be the conventional PF metric ($R_{immediate}/R_{average}$) multiplied by the sum of the weights of all the bearers for that UE. Essentially, the UE would be scaled up by the total weight of the UE's bearers.

The PF metric discussed here may typically correspond to maximizing a logarithmic utility function. However, other concave utility functions are easily accommodated. For example, the PF metric of a UE would be the product of the gradient of the utility function evaluated at the UE's current throughput and the UE's current rate per unit resource, that is, the UE's spectral efficiency. For example, if the utility function is $U(T)=T^{1-\beta}/(1-\beta)$ for $\beta>0$, then the PF metric would be $R_{immediate}/R_{av}^{\beta}$, etc.

A number of considerations may be taken into account in determining an appropriate PF metric to be used as the representation of the load in a cell, and a number of varying circumstances exist that are affected by one or more such considerations. For example, one circumstance that frequently occurs is that of "small flows," in which a UE handles significantly less traffic than do other UEs. Small flows typically do not receive the full throughput that a scheduler could give them based on their RF conditions, and for this reason, their PF metric may drift away from that of other UEs. Small flow UEs frequently transition between having data and not having data, and when they resume data after a pause, their PF metric (and historic throughput) needs to be initialized properly to avoid this drift.

One solution is that whenever a flow becomes "active" after not having data for a period of time, the PF metric of the flow may be initialized based on the value of the PF metric of the scheduled UEs in the previous transmission time interval (TTI). This typically provides better results than does initializing the throughput of the UE to some constant value. Neither a low constant value nor a high constant value works very well.

An alternative solution is to initialize the UE's PF metric to the average of the PF metrics of all UEs that are likely to be scheduled.

Once calculated, the metric might be conveyed, for example, through the "composite available capacity" IE described in the X2 Resource Status Update message described in the 3GPP standard. This IE has been expressed as an integer between 0 and 100 representing "available capacity". The integer value represented by the IE, does not necessarily define the specific metric used to represent capacity or the factors that go in to calculating the metric, but simply conveys the available proportion of the maximum.

A number of embodiments may represent the PF metric as an equivalent available capacity percentage suitable for the composite available capacity IE in the X2 message. One option, for example, is to represent the PF metric as a percentage relative to an "upper bound" value. The PF metric nominally represents the active UEs over which the resources are being split at any particular time. The upper bound in this sense would represent the maximum number of active UEs among which resources may be shared without any UP receiving too few resources. The value of the IE "composite available capacity" would therefore be set at 100*(max(1−PF/upper bound), 0).

Another embodiment sets the composite "available capacity" IE value to (1/(1+PF)) expressed as a percentage value. For example, if the value of PF is 19, the metric would be 5%, if the value of PF is 9, the metric would be 10%, and so on. The rationale for this representation is the following. The available capacity in a cell may be considered a measure of the resources that a new UE handing over to the cell may receive. Since the PF metric in the cell may be considered as a measure of how many UEs are actively sharing the resources within the cell, by the addition of one more UE, the new UE may receive approximately 1/(1+PF) fraction of the resources. Hence the available capacity may be represented by 1/(1+PF) expressed as a percentage.

Another embodiment performs a non-linear or piecewise-linear mapping from PF metric to range {0 ... 100} that is monotonically decreasing with the PF metric, so as to provide a suitable quantization. A further embodiment represents the PF metric by two quantities, one indicating the number of UEs contending for resources in the cell and one indicating the average residual number of resources consumed by high-priority signaling and guaranteed bit rate traffic.

The listing of specific options is exemplary only and is not intended to be limiting.

It will be recognized that guaranteed bit rate (GBR) users should typically receive a higher precedence than should non-GBR users. Therefore, if the GBR load in a cell is high, for example, greater than a target load, the handover threshold may suitably be set based on GBR load. Various measures may be used to represent the GBR load in a cell. In one embodiment, the physical resource block (PRB) utilization due to GBR traffic may be used as the measure of the GBR load in the cell. At that point, irrespective of the non-GBR load, neighbor selection and handover threshold updates may be triggered based on considerations related to GBR users. If the GBR load is low, the handover threshold may be set based on non-GBR load. The historic average throughput used in the calculation of the PF metric typically includes a combination of GBR throughput and non-GBR throughput. Therefore, the PF metric, by using the historic average throughput, incorporates some measure of the GBR usage implicitly.

When the GBR load is less than the target load, a notion of load appropriate for non-GBR may be used, such as a suitably averaged PF metric. The PF metric in a cell may be computed over the "residual resources" available for non-GBR traffic after assignment of the GBR resources, assuming that GBR allocations are typically given a higher priority than non-GBR. Such an approach still provides a good representation of overall load in a cell.

Once a load metric has been determined, a load based handover threshold may in turn be determined. For non-guaranteed bit rate traffic, since the underlying scheduler is proportional fair, the notion of "load" may be thought of as being tied to the PF metric in the macro and pico cells. The PF metric is roughly a reflection of the load in the cell.

Non-guaranteed bit rate traffic will typically be elastic traffic, that is, traffic that can tolerate more or less delay. An example of elastic traffic is transfer control protocol (TCP) traffic. A goal that may be used when managing elastic traffic is to achieve proportional fairness across all base stations. This may be achieved by maximizing a specific form of utility function presented below. For the purposes of load balancing, this maximization may be considered over a longer time scale than the typical scheduling.

Consider UEs $1, \ldots, N$ and eNBs $1, \ldots, B$. Suppose that the UE u would have achievable capacity per unit resource (that is, spectral efficiency) $c_i(u)$ if it were connected to eNB i. Let $\rho_i(u)$ be the fraction of resources in eNB i given to UE u. Throughput achieved by UE u in eNB i is $\rho_i(u)c_i(u)$. It will be noted that these typically are relatively long-term quantities. One objective to optimize the system performance would be to maximize $\Sigma_{eNBs\ i} \Sigma_{UEs\ u\ in\ eNB\ i} \log(\rho_i(u)c_i(u))$, where the logarithm function log( ) is used as an example. As noted earlier, other utility functions could also be suitably used as a system performance objective.

In one embodiment, a network will be considered "load-balanced" if UEs are associated to the appropriate eNBs corresponding to the optimal solution of the above expression.

Given the UE associations, within each eNB i, the optimal resource allocations $\rho_i(u)$ within cell i are similar to allocations that would be assigned to the UEs by a PF scheduler. In one typical embodiment of a PF scheduler, they would be essentially equal for all UEs within a given cell i when viewed at a suitably long time-scale.

An expression for the fraction of resources allocated to a UE u in cell i is $\rho_i(u)=1/N_i$, where $N_i$ is the number of UEs associated with cell i. A PF scheduler metric within the cell i would typically converge to a value proportional to $N_i$ or $1/\rho_i(u)$. This converged PF metric may be denoted as $v_i$, that is, it would represent the PF-based load in cell i.

An approach that may be used by embodiments of the invention for associating UEs to cells for maximizing the above objective is, for any UE it, choose the cell i which maximizes $c_i(u)/v_i$. This can be embodied as a handover decision rule—Hand off UE u from cell j to cell i when $c_i(u)/v_i>c_j(u)/v_j$.

In one embodiment, a UE should go to a cell where it will receive the highest throughput considering the resource contention, that is, the load, in the cell. The PF metric captures the contention for resources given the scheduling mechanism. If the UE's spectral efficiency in cell i is $c_i(u)$, and PF metric in the cell is $v_i$, then the throughput the UE could attain in cell i is roughly $$\frac{c_i(u)}{v_i}.$$

Thus, this embodiment in which a UE should go to a cell where it will receive the highest throughput also corresponds to the handover decision rule—Hand off UE u from cell j to cell i when $c_i(u)/v_i>c_j(u)/v_j$.

Thus, expressed in terms of spectral efficiency, if $v_i$ and $v_j$ are the PF-based load in cells i and j, respectively, then the handover rule may be that the UE currently in cell j should handover to cell i if $c_i(u)/v_i>c_j(u)/v_j$, or $$\frac{c_i(u)}{c_j(u)} > \frac{v_i}{v_j}$$

where $c_i(u)$, $c_j(u)$ are spectral efficiencies of UE u in cells i, j, respectively. In one embodiment, if the number of UEs in the cell is small, a correction factor can be added, which will diminish asymptotically.

Alternatively, the load-balancing rule can be represented in terms of RSRP (Reference Signal Received Power) or RSRQ (Reference Signal Received Quality), which are well-known quantities used to describe the characteristics of the signal receive by a UE from an eNB. The well-known Shannon approximation of spectral efficiency is $c_i(u)=a \log(1+b\ SINR_i(u))$, where $SINR_i(u)$ is the signal to interference plus noise ratio of the UE u in cell i. An expression relating signal to noise ratio (SINR) to RSRQ is $SINR_i(u)=q_i(u)/(1-q_i(u))$ where $q_i(u)$ is linear RSRQ of UE u in cell i. Additionally let $q_j(u)$ denote the linear RSRQ of UE u in cell j. Expressed in these quantities, one embodiment for the handover rule would be:

UE in cell j should handover to cell i if:

$$\frac{q_i(u)}{q_j(u)} > \frac{v_i}{v_j}$$

The right side of this expression is the cell individual offset for a triggering event A3 comprising a load-dependent and cell-specific bias. In decibels (dB), the left hand side of the above equation is the difference between the RSRQ of cell i and the RSRQ of cell j. This can be more clearly visualized if the above equation is rewritten in decibels or dB (rather than linear) units as $$q_i(u)+(v_j-v_i)>q_j(u)$$

This can be viewed as the triggering definition of an A3 event as defined in the 3GPP Radio Resource Control (RRC) specification for triggering measurement reports, wherein UEs in cell j use a cell individual offset specific to cell i of $(v_j-v_i)$ (expressed in dB). Therefore, when determining whether to change the handover threshold for a given neighbor based on load, a cell individual offset can be reconfigured using radio resource control.

One circumstance that may affect both the determination of a PF metric and the use of a PF metric as the basis of the load metric in order to make handover decisions is the possibility of less than full PRB utilization by non-GBR traffic. Typically the traffic will be elastic, such as TCP, meaning that over small time scales, TCP will expand its window to fill up the pipe. Therefore, even if a relatively small number of users are in an active data session, the system will remain busy. Also as new users become active, if their PF metric is initialized appropriately, then they will not cause any biasing of the PF metric of scheduled UEs.

One approach for addressing this circumstance consists of initializing the PF value of a newly active user to be the PF metric (either maximum, or average, or median, or a certain percentile) of the scheduled UEs in the previous subframe as described above. In this case, for a substantial fraction of the time there will not be a need to specially account for "less than full" PRB utilization by non-GBR traffic. However, depending on the workload in the cell, non-GBR traffic may not take up all the resources that it could, such as during night hours in office areas, for example. To correct for this, it is possible to take into account the fraction of PRBs utilized by non-GBR traffic ($\rho_i$ in cell i) as a proportion of the total PRBs that could have been used had data been available. The above decision rule can be modified so that the UE should prefer cell i if $$\frac{c_i(u)}{c_j(u)} > \frac{\rho_i v_i}{\rho_j v_j}$$

and cell j otherwise if using the spectral efficiency-based handover decision rule, or $$\frac{q_i(u)}{q_j(u)} > \frac{\rho_i v_i}{\rho_j v_j}$$

if using the RSRQ-based criterion (in linear units). In an embodiment, the fraction $\rho_i$ for a cell can be conveyed to neighbor cells by using X2 messaging, for example using the DL non-GBR PRB Usage, DL GBR PRB Usage, and DL Total PRB usage IEs defined in the 3GPP standards as part of Radio Resource Status in the Resource Status Update. For example, the fraction $\rho_i$ can be calculated as (DL non-GBR PRB usage)/(100–DL Total PRB usage), where the usage numbers are expressed as percentages.

It is understood that additionally, hysteresis thresholds may be used to prevent rapid ping-pong handovers of a UE from one cell to another and back to the first cell.

When a new handover threshold is determined for given cells i and j, rather than immediately applying the new threshold, it may be preferable to use a small modification to the currently applied threshold in the direction of the new threshold. This is beneficial for system stability, for example to avoid overshoot. So the threshold may be adjusted by relatively small steps, rather than immediately upon calculation of a new threshold.

This rule has the advantage of low complexity.

The criterion is applied to determine the load-based handover threshold for a subset of neighbors, and a subset of neighbors are informed of the change of threshold. The specific members of the subset selected may be based on $v_i$, $v_j$, or the ratio of $v_i$ to $v_j$. The new handover threshold for one or more neighbors may be communicated to a subset of UEs, suitably as a "cell individual offset" in radio resource control (RRC) configuration. The subset of UEs to be thus notified may be selected based on the highest load, that is, the lowest PF metric.

Changing of thresholds needs to be managed between eNBs to avoid ping-ponging, that is, the passing of a UE back and forth between neighbor eNBs because one eNB has changed its handover threshold and the other has not made a corresponding change. Additionally it is also desirable that if one eNB changes the handover threshold for its UEs towards a target neighbor eNB, the neighbor eNB should also adjust its own threshold for its UEs to hand over towards the first eNBs. If there is a mismatch between the thresholds in the two directions, then the desired load balancing may not be achieved. For example, while the first eNB is trying to hand over its UEs to the second eNB, the second eNB may be handing other UEs over to the first eNB at the same rate, resulting in no shifting of the load. Thus when an eNB determines that an update of the handover threshold relative to a given neighbor is needed, the neighbor eNB should also update its own setting for a handover to the first eNB. One approach is to use the 3GPP standard X2 Mobility Change message. This allows an eNB1 to notify a neighbor eNB2 that it is changing its HO threshold for handoff from eNB1 to eNB2, and the neighbor eNB should correspondingly adjust its threshold for handoffs from eNB2 to eNB1.

One potential problem with this approach is that since the eNB1 will likely notify only a subset of the UEs of the updated threshold (to reduce signaling overhead due to Radio Resource Configuration, or RRC, messages), the eNB2 should ideally apply the corresponding threshold change for avoiding ping-pong handovers only for those UEs. But the eNB2 does not directly know which UEs are the ones eNB1 has notified of the update.

An alternative approach is based on the following observation. Whenever a UE hands over from eNB1 to eNB2, the eNB1, which may be known as the source eNB, provides eNB2 (the target eNB) the full measurement configuration for the UE in an X2 message. An RRC at the source eNB prepares a Handover Preparation Info IE, including measurement configuration, which is sent to the target eNB in an X2 Handover Request message. Based on this information, eNB2 can know the exact "cell individual offset" that was configured at the UE by the source eNB for the purpose of setting a bias in the handover criterion. When the target eNB accepts the handover, it can instantiate the backward threshold specifically for that UE to ensure that rapid ping-pong handovers for that UE are avoided. This approach to providing updated information eliminates the problem noted above, and also works irrespective of whether the load-based threshold was computed based on a UE-specific rule or non-UE-specific rule.

The following illustrates an embodiment which makes use of handover thresholds that are UE-specific as well as load-based.

A general UE-specific handover rule would be of the form: UE in cell j should hand over to cell i if $$\frac{q_i(u)}{q_j(u)} > f\left(q_j(u); \frac{v_i}{v_j}\right)$$

where as before, the right hand side represents (in linear rather than dB terms) the cell individual offset, but now the function $f(\ )$ representing the threshold is both load-based and UE-specific (that is, it may depend on the channel quality $q_j(u)$ of a given UE u). As before, the above rule may be rewritten expressing the quantities $q_i(u)$, $q_j(u)$, and the function $f(\ )$ in decibels (or dB), as $$q_i(u) - f(q_j(u); v_i/v_j) > q_j(u)$$

Expressed in this form, the decibel value of the function may interpreted as a Cell-Individual Offset for Event A3 as defined in the 3GPP standards. However in this case since the function $f(\ )$ depends on the channel quality $q_j(u)$ of a given UE u, the Cell Individual Offset would be potentially different for each UE u.

A specific embodiment of the function $f(\ )$ is as follows:

$$f\left(q_j(u); \frac{v_i}{v_j}; b\right) := \frac{\{1 - (1-b)q_j(u)\}^{v_i/v_j} - \{1 - q_j(u)\}^{v_i/v_j}}{q_j(u)[\{1 - (1-b)q_j(u)\}^{v_i/v_j} - (1-b)\{1 - q_j(u)\}^{v_i/v_j}]}.$$

where b is a parameter that expresses the dependence of the UE's spectral efficiency on its SINR, for example through the Shannon approximation of spectral efficiency $c_i(u) = a \log(1 + b \operatorname{SINR}_i(u))$. This embodiment of the function $f(\ )$ has the following properties. At $q_j = 0$, $f(0) = v_i/v_j$ and at $q_j = 1$, $f(1) = 1$ for any b, $v_i/v_j$.

It may be noted that the handover decision rule with the non-UE-specific threshold given earlier $$\frac{q_i(u)}{q_j(u)} > \frac{v_i}{v_j}$$

is achieved by simply using $f(0)$, that is, by removing dependence on $q_j$ in the threshold. That handover rule is agnostic to the identity or channel quality $q_j$ of any specific UE. Typically, the regime of interest wherein load-based handover threshold adaptation is likely to be necessary is $$\frac{v_i}{v_j} < 1;$$

if a UE is currently in cell j, then handover to cell i will likely happen if $$\frac{v_i}{v_j} < 1.$$

In this regime, the UE-agnostic rule would be expected to perform about as well as the rule based on the full form of the function $f(\ )$.

It may be noted that other forms of the function $f(\ )$ resulting in UE-specific or non-UE-specific thresholds may be utilized above. For example, although the function $f(\ )$ is written above as a function of the ratio $v_i/v_j$, it may in general be a ratio of functions $f_1(v_i)$ and $f_2(v_j)$, i.e. $f_1(v_i)/f_2(v_j)$. The function $f(\ )$ may also depend on other meaningful forms such as a difference of functions $f_3(v_i)$ and $f_4(v_j)$, i.e. $f_3(v_i)/f_4(v_j)$, etc. Typically such embodiments will have the property that as $v_f$ becomes larger relative to $v_i$, there is a greater tendency to hand over UEs from cell j to cell i.

The function $f(\ )$ produces a threshold that depends on the UE's current $q_j(u)$.

One problem with using a UE-specific threshold is the following: When the threshold is changed for a specific UE using a value specific to that UE, the neighbor eNB needs to be aware of the threshold change so that it can adjust its own thresholds for the opposite direction and prevent ping-pong handover. This problem with using UE-specific thresholds can be handled as follows. Suppose cell j needs to offload UE u to cell i, based on a threshold that was specific to UE u and cell j. Cell j configures UE u with the Cell Individual Offset which is UE- and Cell-specific. For example, the Cell Individual Offset may be based on the function $f(\ )$ above. When UE u's A3 event triggers based on the Cell Individual Offset for cell i, source eNB j sends a X2 Handover Request message to the target eNB i. As per the 3GPP specification, this message contains the "Handover Preparation Information" IE prepared by source cell j's radio resource control (RRC), and in this, the full measurement configuration used for the UE at the source eNB is included (e.g. in the AS-Config which contains the full MeasConfig for the UE u)—including the Cell Individual Offset for cell i. In 3GPP release 10, the Handover Preparation Info is allowed to send the UE's RSRP/RSRQ measurement results as well.

When Target eNB j receives the Handover Preparation Info, it can thus check the Cell Individual Offset for this UE. Based on this check, it can provide its own Cell Individual Offset for the UE to use after the handover in the "Handover Command" to the UE. What this means is that the target cell j will set the Cell Individual Offset to be negative of the cell Individual Offset applied in cell i.

For networks of cells utilizing eICIC (Enhanced Inter-cell Interference Coordination) through the use of ABS (Almost Blank Subframes), an approach generally similar to the above rules may be used. Through the use of ABS, a macro eNB transmits almost nothing (i.e. an almost blank subframe) in certain subframes known as ABS subframes, and performs its regular transmission in the remaining subframes, known as non-ABS subframes. From a macro cell's perspective, these two sets of subframes may be respectively referred to as "the ABS portion of the macrocell's resources" and "the non-ABS portion of the macrocell's resources". Due to this, a pico cell that normally receives interference from the macro eNB would now receive very little interference during the macro eNB's ABS subframes, and would receive normal interference during the non-ABS subframes. From the pico cell's perspective, the subframes during which the interfering macro eNB uses Almost Blank Subframes may be referred to as "the ABS portion of the pico cell's resources", and the remaining subframes may be referred to as "the non-ABS portion of the pico cell's resources".

An important observation informing the application of the above approach for load-balancing and load-based determination of the handover threshold is that in pico cells using eICIC with ABS, the PF metric may converge to two different values, because the value within the ABS portion of the resources in the pico cell may be different from the value within the non-ABS portion. The application to eICIC with ABS makes use of this observation. This is an inherent property of schedulers such as the PF scheduler, which try to trade off the spectral efficiency achievable by scheduling UEs in good channel conditions with fairness considerations so that UEs do not experience too poor performance. For example, the load (PF) metric $v_a$ in the ABS portion of a pico cell's resources may be proportional to the number of users that receive allocations substantially within the ABS subframes in the pico cell, and the load (PF) metric $v_{na}$ in the non-ABS portion of a pico cell's resources may be proportional to the number of users that receive allocations substantially within the non-ABS subframes in the pico cell. In general, whether a UE connected to the pico cell receives allocations substantially within the ABS portion of the pico cell's resources or the non-ABS portion depends on the value of the spectral efficiency achievable by the UE within the ABS portion relative to the spectral efficiency achievable by the UE within the non-ABS portion. The relative values of $v_a$ and $v_{na}$ will thus in general depend on the distribution of users within the pico cell. In addition various other factors such as the proportion of ABS subframes employed by the interfering macro relative to the total number of subframes may also influence the relative values of $v_a$ and $v_{na}$.

In addition, according to the 3GPP release 10 specification, one "measurement restriction subset" can be configured for measurements to be made by the UE on a given neighbor cell, so that a UE would measure a neighbor cell only in a specified, or restricted, set of subframes. Suppose, then, that a UE is to be configured to take measurements from a neighbor pico cell. The UE may be configured to measure a neighbor pico cell only within the ABS portion of the pico cell. Conversely, if a UE is to be configured to make measurements for a neighbor macro cell, it may be configured to restrict its measurement to just the subframes where the neighbor macro cell does not employ ABS. For measurements to be made by a UE on its own serving cell (rather than on a neighbor cell), the 3GPP release 10 specification allows configuring two measurement restriction subsets. That is, the UE may be configured to make two separate sets of measurements, each corresponding to the channel quality experienced by the UE in a specified set of subframes. For measurements to be made by a UE connected to a pico cell for its own serving pico cell, these two measurement restriction subsets will typically be configured such that one measurement restriction set is a subset of the ABS portion of the pico cell, while the second measurement restriction set is a subset of the non-ABS portion of the pico cell.

Consider a UE u in a macro cell. Suppose its spectral efficiency in the macro cell is $c_M(u)$ and its linear RSRQ is $q_M(u)$ (based on measurements restricted to the non-ABS portion of the macro cell's resources). Suppose also that the UE's achievable spectral efficiency in the ABS portion of a neighboring pico cell's resources is $c_a(u)$, and its linear RSRQ within the ABS portion of the neighboring pico cell's resources is $q_a(u)$, based on measurements restricted to the ABS portion of the pico cell's resources. Within the pico cell, the PF metric of the scheduled UEs within the ABS and the non-ABS portions of the pico cell's resources may converge to different values as observed earlier. If the long-term average PF metric value in the macro cell is $v_M$ and the long-term average PF metric value within the ABS portion of the pico cell's resources is $v_a$, the handover decision rule may be expressed as follows:

A UE u in a macro-cell should handover to the pico cell if (expressed in spectral efficiencies)

$$\frac{c_a(u)}{c_M(u)} > \frac{v_a}{v_M}$$

(Alternatively, expressed in linear RSRQ using a non-UE-specific threshold)

$$\frac{q_a(u)}{q_M(u)} > \frac{v_a}{v_M}$$

(Alternatively, expressed in RSRQ in dB units using a non-UE-specific threshold)

$$q_a(u)+(v_M-v_a) > q_M(u)$$

(Alternatively, expressed in linear RSRQ using a UE-specific threshold)

$$\frac{q_a(u)}{q_M(u)} > f\left(q_M(u); \frac{v_a}{v_M}\right)$$

Where one embodiment of the UE-specific threshold function $f$ is given by $$f\left(q_M(u); \frac{v_a}{v_M}; b\right) :=$$

$$\frac{\{1-(1-b)q_M(u)\}^{v_a/v_M} - \{1-q_a(u)\}^{v_a/v_M}}{q_M(u)[\{1-(1-b)q_M(u)\}^{v_a/v_M} - (1-b)\{1-q_M(u)\}^{v_a/v_M}]}$$

It should be understood that similar to the above form for the function $f()$, other appropriate forms could be used, such as those that involve a ratio of functions of $v_a$ and $v_M$ rather than directly the ratio of $v_a$ and $V_M$. Typically such embodiments will have the property that as $v_M$ becomes larger relative to $v_a$, there is a greater tendency to hand over UEs from the macro cell to the pico cell.

It is understood that the UE u in the pico cell would use the converse rule for deciding to hand over to the macro cell. In addition, hysteresis thresholds may be used to prevent rapid ping-pong handovers of a UE from one cell to another and back to the first cell.

In principle, the UE u would have achievable spectral efficiencies $c_a(u)$ and $c_{na}(u)$ within ABS and non-ABS if it were to connect to the pico cell (based on measurements restricted to ABS and non-ABS portions respectively, if both were to be simultaneously obtainable), and $c_M(u)$ if it connects to a given macro cell. Such separate measurements for the ABS and non-ABS portions can be simultaneously obtained, for example, for the UE's serving pico cell if UE is connected to a pico cell. If the UE is currently in a pico cell and the pico eNB is evaluating the possibility of offloading the UE to a macro eNB, the following procedure may be used:

The UE may be classified as "likely ABS" if $c_{na}(u)/c_a(u)/ \leq v_{na}(u)/v_a(u)$ and "likely non-ABS" otherwise. If the UE is "likely ABS," handover to the macro cell may occur if $$\frac{c_M(u)}{c_a(u)} > \frac{v_M}{v_a}.$$

If the UE is "likely non-ABS, The UE would handover to the macro cell if $$\frac{c_a(u)}{c_M(u)} > \frac{v_a}{v_M}$$

and remain in the pico cell otherwise. Corresponding handover decision rules can be expressed using the RSRQ, constructed analogously to the RSRQ-based rules described earlier.

Similar rules may be applied to handovers from one pico cell to another, such as in a cluster of pico cells. For example, a similar rule to the one above might be used for offload from one pico cell to another neighbor pico cell in the presence of ABS, replacing the macro's load metric $v_M$ above with a metric representing the load of the neighbor pico cell within the ABS portion of that pico cell.

To understand the key step above that the PF metric within the ABS and non-ABS portions of a pico cell will generally take on different values $v_a$ and $v_{na}$, Consider a pico cell that runs a PF-type scheduler. The eICIC is being used, and the pico cell experiences a fraction 'a' of subframes as ABS.

For each UE u in the pico cell, define $c_a(u)$ and $c_{na}(u)$ as the spectral efficiencies in the ABS and non-ABS portions of the pico cell's resources, respectively. Let the fraction of resources allocated to UE u in ABS and non-ABS be $\rho_a(u)$ and $\rho_{na}(u)$ respectively, so that $\Sigma_u \rho_a(u)=a$, and $\Sigma_u \rho_{na}(u)=1-a$. Consider the optimal behavior of PF within the pico cell in the presence of ABS. The objective function can again be taken as the logarithm utility function, which as noted earlier is the same objective function that the underlying PF scheduling algorithm tries to maximize. It can be shown that the log-utility-maximizing resource allocation fractions $\{\rho_a(u), \rho_{na}(u)\}$ within the pico cell with ABS have the following properties (for suitable time-scales):

A subset of UEs receive allocations substantially only within non-ABS subframes (i.e., $\rho_a(u)=0$ but $\rho_{na}(u)>0$), Another subset of UEs get allocations substantially only within ABS subframes ($\rho_a(u)>0$, but $\rho_{na}(u)=0$)

All UEs that receive substantial allocations in both ABS and non-ABS portions of the pico cell's resources (i.e. $\rho_a(u)>0$ and $\rho_{na}(u)>0$) satisfy $c_{na}(u)/c_a(u)=K_a/K_{na}$ for constants $K_a$, $K_{na}$. This is a relatively restrictive condition, that is, it will occur only rarely for a small number of UEs.

To take a specific example, if the set of UEs that receive substantial allocations in both ABS and non-ABS portions of the pico cell's resources is empty, then:

For all UEs with $\rho_a(u)>0$, $\rho_a(u)=a/N_a$, where $N_a$ is the number of UEs with $\rho_a(u)>0$.

For all UEs with $\rho_{na}(u)>0$, $\rho_{na}(u) \leq (1-a)/N_{na}$, where $N_{na}$ is the number of UEs with $\rho_{na}(u)>0$.

$N_a+N_{na}=N$, the total number of UEs in the cell.

For all UEs with $\rho_{na}(u)>0$, $c_{na}(u)/c_a(u) \geq aN_{na}/(1-a)N_a$.

For all UEs with $\rho_a(u)>0$, $c_{na}(u)/c_a(u) \leq aN_{na}/(1-a)N_a$.

That is, a threshold $aN_{na}/(1-a)N_a$ distinguishes the UEs in ABS from the UEs in non-ABS. The PF metric of UEs that receive allocations substantially within the ABS portion of the pico cell's resources converges to $v_a=N_a/a$, and the PF metric of UEs that receive allocations substantially within the ABS portion of the pico cell's resources converges to $v_{na}=N_{na}/(1-a)$, which in general is different from $v_a$. Thus, the PF metric within the ABS and non-ABS portions of the pico cell resources will in general take on different values $v_a$ and $v_{na}$. The above embodiments of the handover decision rule between macro and pico cells are based on this.

Figure 3:
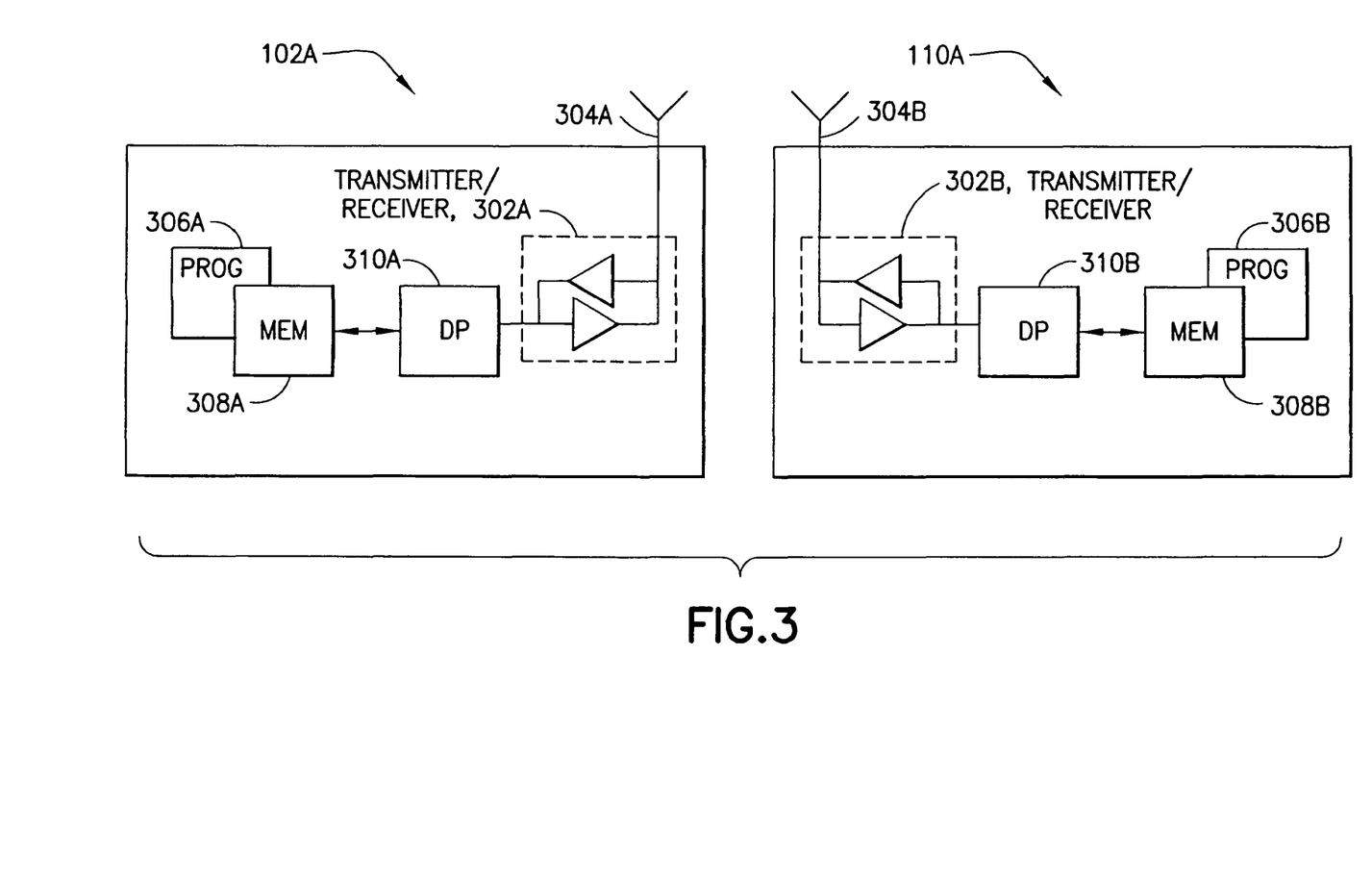
FIG. 3 illustrates a base station and a user equipment according to an embodiment of the present invention.

Reference is now made to FIG. 3 for illustrating a simplified block diagram of details of an eNB such as the eNB 102A and a UE such as the UE 110A.

The eNB 102A includes a suitable radio frequency (RF) transmitter and receiver 302A coupled to one or more antennas 304A for bidirectional wireless communications. The eNB 102A also includes a data processor (DP) 310A, and a memory (MEM) 308A that stores a program (PROG) 308A. The UE 110A also includes a transmitter and receiver 302B, antenna 304B, DP 310B, and MEM 308B that stores a PROG 306B.

At least one of the PROGs 306A and 306B is assumed to include program instructions that, when executed by the associated DP, enable the electronic device to operate in accordance with the exemplary embodiments of this invention as was detailed above in detail.

In general, the exemplary embodiments of this invention may be implemented by computer software executable by the DP 310A of the eNB 102A and the other DPs, or by hardware, or by a combination of software and/or firmware and hardware. The interactions between the major logical elements should be obvious to those skilled in the art for the level of detail needed to gain an understanding of the broader aspects of the invention beyond only the specific examples herein. It should be noted that the invention may be implemented with an application specific integrated circuit ASIC, a field programmable gated array FPGA, a digital signal processor or other suitable processor to carry out the intended function of the invention, including a central processor, a random access memory RAM, read only memory ROM, and communication ports for communicating between the AP 12 and the UE 10 as detailed above.

In general, the various embodiments of the UE 110A can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 308A and 308B may be of any type suitable to the local technical environment and may be implemented using any suitable data storage technology, such as semiconductor based memory devices, magnetic memory devices and systems, optical memory devices and systems, fixed memory and removable memory. The DPs 310A and 310B may be of any type suitable to the local technical environment, and may include one or more of general purpose computers, special purpose computers, microprocessors, digital signal processors (DSPs) and processors based on a multi-core processor architecture, as non-limiting examples.

At least one of the memories is assumed to tangibly embody software program instructions that, when executed by the associated processor, enable the electronic device to operate in accordance with the exemplary embodiments of this invention, as detailed by example above. As such, the exemplary embodiments of this invention may be implemented at least in part by computer software executable by the controller/DP of the eNB 102A or UE 110A, or by hardware, or by a combination of software and hardware.

Figure 4:
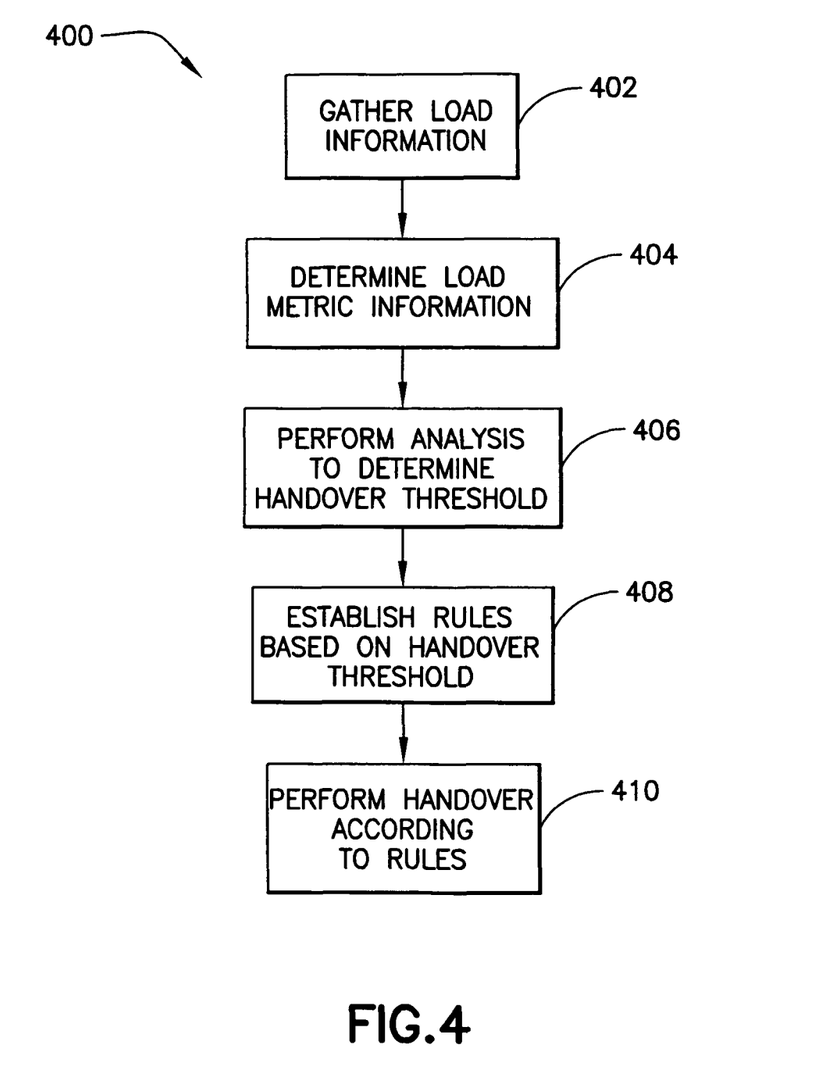
FIG. 4 illustrates a process according to an embodiment of the present invention.

FIG. 4 illustrates steps of an exemplary process according to one or more embodiments of the present invention. At step 402, load information is gathered for one or more eNBs in a network. The load information may suitably comprise information such as that described above, and may be gathered using any appropriate mechanism, such as those exemplary mechanisms described above. At step 404, load metric information is determined. The load metric information may suitably be one or more proportional fair metrics to be used to identify loads on UEs, and may be designed to account for GBR traffic and PRB utilization. At step 406, analysis is performed for one or more UEs to determine handover thresholds between eNBs, and at step 408, rules are established for handover according to the thresholds. At step 410, handover is performed according to the rules.

Various modifications and adaptations to the foregoing exemplary embodiments of this invention may become apparent to those skilled in the relevant arts in view of the foregoing description. While various exemplary embodiments have been described above it should be appreciated that the practice of the invention is not limited to the exemplary embodiments shown and discussed here.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

In addition, the various names used for the various parameters, such as $v_i$, $v_j$, $c(u)$, and the like, are not intending to be limited in any respect, as these parameters may be identified by any suitable names. Further, the formulas and expressions that use these various parameters may differ from those expressly disclosed herein.

We claim:

1. An apparatus comprising:
   memory;
   at least one processor;
   a program of instructions configured to, with the memory and the at least one processor, configure the apparatus to perform actions comprising at least:
   determining a load metric for each of one or more cells of a wireless communication network,
      wherein the load metric is based at least in part on a weighted proportional fair metric of selected user equipment, and
      wherein the weighted proportional fair metric is an average over a specified time interval of a weighted proportional fair metric of user equipments scheduled in subframes within the interval; and
   determining handover procedures between the one or more cells based on the determined load metric for the one or more cells.

2. The apparatus of claim 1,
   wherein determining the handover procedures comprises determining a handover threshold to be used to determine whether a handover from a serving cell to a neighbor cell should occur, and
   wherein the handover threshold is based at least in part on a function of load metrics for two or more cells, wherein a load metric represents load conditions affecting a cell.

3. The apparatus of claim 2,
   wherein the load metric of at least cell comprises an average of a proportional fair metric computed over intervals wherein at least one base station serving a neighbour cell uses almost blank subframes.

4. The apparatus of claim 2, wherein determining the handover threshold is based at least in part on the load metrics, and wherein setting the handover threshold comprises adapting the handover threshold by a step size in a direction of a desired threshold.

5. The apparatus of claim 2, wherein the comparison comprises evaluating a relative magnitude of the load metrics.

6. The apparatus of claim 2, wherein determining the handover threshold further comprises transmitting a triggering message comprising a cell individual offset to a user equipment, wherein the triggering message is configured to trigger a measurement related to handover based on the cell individual offset, and wherein the offset is based at least in part on a comparison of load conditions between the serving cell and the neighbor cell.

7. The apparatus of claim 2, wherein the handover threshold is based at least in part on reference signal received power.

8. The apparatus of claim 6, wherein the cell individual offset is computed relative to a neighbor macro cell for a user equipment served by a pico base station, wherein the neighbor macro base station uses almost blank subframes, wherein the cell individual offset is conveyed to the user equipment using radio resource control messages, wherein the cell individual offset is computed using a comparison between load metrics for the serving pico base station and the neighbor macro base station, wherein the load metric for the serving pico base station is computed as an average of the proportional fair metric in the pico base station over at least one interval in which the neighbor macro base station uses almost blank subframes, and wherein the load metric of the neighbor macro cell is computed as an average of the proportional fair metric in the neighbor macro base station within an interval comprised of non almost blank subframe resources used by the macro base station.

9. The apparatus of claim 8, wherein the cell individual offset is computed relative to a neighbor pico base station for a user equipment served by a macro base station, wherein the serving macro base station uses almost blank subframes, wherein the cell individual offset is conveyed to the user equipment using radio resource control messages, wherein the cell individual offset is computed using a comparison between a comparison of load metrics for the neighbor pico base station and the serving macro base station, wherein the load metric for the neighbor pico base station is computed as an average of the proportional fair metric in the pico base station over at least one interval in which the macro base station uses almost blank subframes, and wherein the load metric of the serving macro base station is computed as an average of the proportional fair metric in the macro base station within an interval comprised of non almost blank subframe resources used by the macro base station.

10. The apparatus of claim 8, wherein the average of the proportional fair metric in the pico base station is based, at least in part, on a number of users receiving allocations substantially within the almost blank subframes.

11. The apparatus of claim 1, wherein the apparatus is a base station operating in a network and wherein the actions further comprise exchanging load information and handover information between base stations.

12. The apparatus of claim 11, wherein the load information and handover information is exchanged between base stations in the form of 3GPP standard X2 messages.

13. The apparatus of claim 12, wherein the load information is conveyed using the composite available capacity information element in the 3GPP standard X2 messages.

14. The apparatus of claim 12, wherein the load information is a representation of a proportional-fair based load metric.

15. The apparatus of claim 14, wherein the handover threshold is based at least in part on spectral efficiency.

16. The apparatus of claim 1, wherein the load metric of a cell is based on a value, at least in part, proportional to a number of users in the cell.

17. A method comprising:

configuring at least one processor to cause an apparatus to perform actions comprising at least:

determining a load metric for each of one or more cells of a wireless communication network, wherein the load metric is based at least in part on a weighted proportional fair metric of selected user equipment, and wherein the weighted proportional fair metric is an average over a specified time interval of a weighted proportional fair metric of user equipments scheduled in subframes within the interval; and determining handover procedures between the one or more cells based on the determined load metric for the one or more cells.

18. The method of claim 17, wherein determining the handover procedures comprises determining a handover threshold to be used to determine whether a handover from a serving cell to a neighbor cell should occur, and wherein the handover threshold is based at least in part on a comparison of load metrics for two or more cells, wherein a load metric represents load conditions affecting a cell.

19. A non-transitory computer readable medium storing a program of instructions, execution of which by a processor configures an apparatus to perform actions comprising at least:

determining a load metric for each of one or more cells of a wireless communication network, wherein the load metric is based at least in part on a weighted proportional fair metric of selected user equipment, and wherein the weighted proportional fair metric is an average over a specified time interval of a weighted proportional fair metric of user equipments scheduled in subframes within the interval; and determining handover procedures between the one or more cells based on the determined load metric for the one or more cells.

* * * * *